United States Patent [19]
Faye

[11] 3,790,722
[45] Feb. 5, 1974

[54] MAGNETIC TAPE CARTRIDGE DIALER

[76] Inventor: Andre Faye, 14, Rue du Foubourg Saint-Honare, Paris, France

[22] Filed: Oct. 11, 1972

[21] Appl. No.: 296,545

[52] U.S. Cl. .......................... 179/90 BB, 179/90 AD
[51] Int. Cl. .......................................... H04m 1/46
[58] Field of Search .......... 179/90 AD, 90 B, 90 BB

[56] References Cited

UNITED STATES PATENTS

| | | | |
|---|---|---|---|
| 3,427,406 | 2/1969 | Kuehnle | 179/90 BB |
| 3,716,676 | 2/1973 | Tatematsu et al. | 179/90 BB |
| 3,495,229 | 2/1970 | Kuehnle | 179/90 BB |

*Primary Examiner*—Kathleen H. Claffy
*Assistant Examiner*—Gerald Brigance

[57] ABSTRACT

Automatic call transmitter comprising a plurality of cartridge tape recorders and readers with recording heads, readout heads, capstans and capstan motors. Magnetic cartridges can be inserted into these recorders and readers. The capstan of the recorder and reader drives the magnetic tape of the cartridge. Alternating current pulses are generated under the control of the dial of a telephone set and these pulses are applied to the recording heads and recorded on a cartridge tape. An amplifier is connected to the readout heads for reading out the recorded pulses and the read out pulses are applied to a relay connected in parallel to the dial terminals. The operation of this relay simulates the dial actuation.

5 Claims, 9 Drawing Figures

MAGNETIC TAPE CARTRIDGE DIALER

The present invention relates to automatic call transmitters or dialers and particularly to automatic dialers employing as a code bearing medium magnetic tapes contained in cartridges.

The term "magnetic cartridge" is herein used in contradistinction to the term "magnetic cassette." A magnetic cassette has two reels and a cabestan which are to be driven separately while a magnetic cartridge has a single passive reel and a single driven member, its capstan. It is the capstan which drives the tape and the tape which drives the reel. It results that magnetic cartridges as a medium for storing specific directory information for automatic dialers are more compact, more easily operable and of lower installation and maintenance costs than magnetic cassettes.

Magnetic dialer devices have been successfully proposed over the years since they have, with respect to toothed disc dialers and card dialers, the advantage that the subscriber may physically encode the magnetic memory of the device with the dial of his telephone set and therefore that no specific encoding apparatus need be provided in the dialer. But in the prior art magnetic dialers, the memory is an internal part thereof, such as a magnetic drum of a multi-track magnetic tape, from which it results that the subscriber has to physically select the portion of the memory he wishes to use and that the number of possible telephone calls is limited by the capacity of the memory. In other words, adressing is necessary and only a limited number of called subscribers can be adressed by the dialer.

An object of the invention is to provide an automatic call transmitter of the magnetic memory type co-operating with an unlimited number of external unitary memories insertable into the call transmitter.

Another object of the invention is to provide an automatic call transmitter having magnetic memories inscribable by means of a telephone dial.

The automatic call transmitter of the invention cooperates with a telephone set having a dial and comprises a plurality of cartridge tape recorders and readers with recording heads and readout heads in which magnetic cartridges can be inserted, means for selecting a recording mode and a readout mode of said heads, alternating current pulse generating means controlled by said dial in said recording mode, means for applying the pulses generated by said generating means to the recording heads and recording said pulses on a cartridge tape, an amplifier connected to said read-out heads in said readout mode for reading out the recorded pulses, at least one relay connected in parallel to the dial terminals and means for applying the pulses amplified by said amplifier to said relay.

According to another feature of the invention, a plurality of cartridges can be read out successively and automatically by the call transmitter and the directory numbers which they contain are sequentially sent to the telephone line, each directory number being transmitted in the case where the called subscriber having the preceding number does not answer and after an adjustable delay.

According to a further feature of the invention, the call transmitter comprises a particular tape recorder and reader cooperating with a special cartridge which will be called in the following temporary store cartridge. This cartridge can be controlled either by the dial or by a special button. When it is controlled by the dial, the dialed number is set onto the line and it is simultaneously recorded on the cartridge tape. All the dialed numbers are successively recorded on the cartridge tape, the preceding number being erased before the actual number is written in. When the temporary store cartridge is controlled by the special button, the number recorded on the tape is read out and applied to the line.

These and other features of the present invention will be more fully apprehended from the following detailed specification taken in conjunction with the appended drawings in which.

Figure 7:
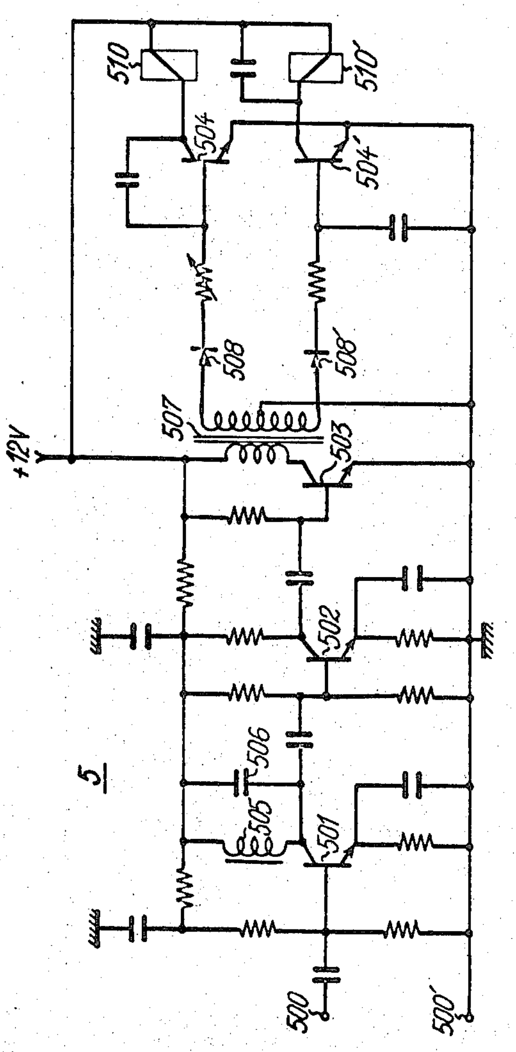

FIGS. *6a* and *6b*represent the programmer of the automatic call transmitter;

FIG. 7 represents the readout amplifier; and

Figure 8:
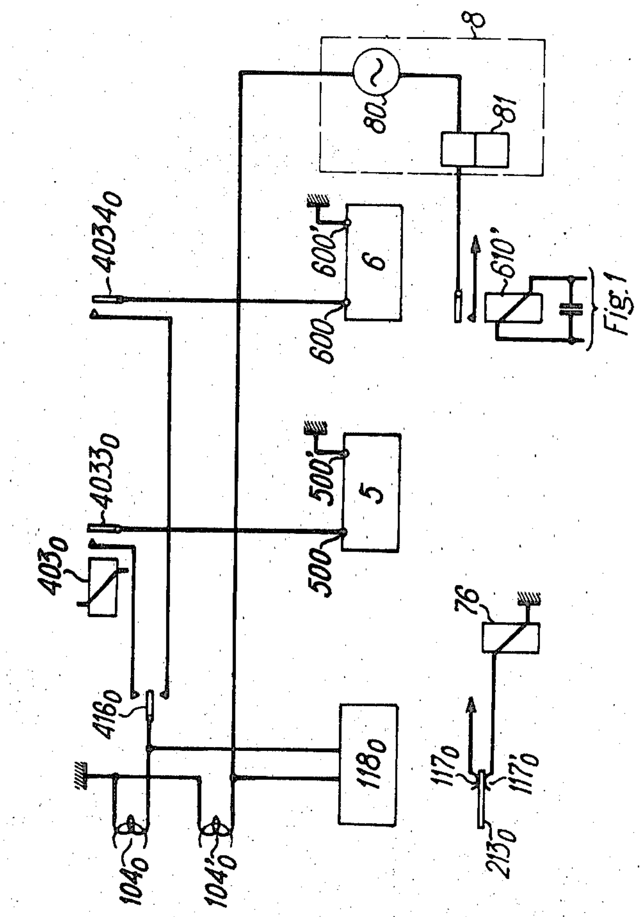

FIG. 8 represents the programmer of the temporary store cartridge.

Figure 1:
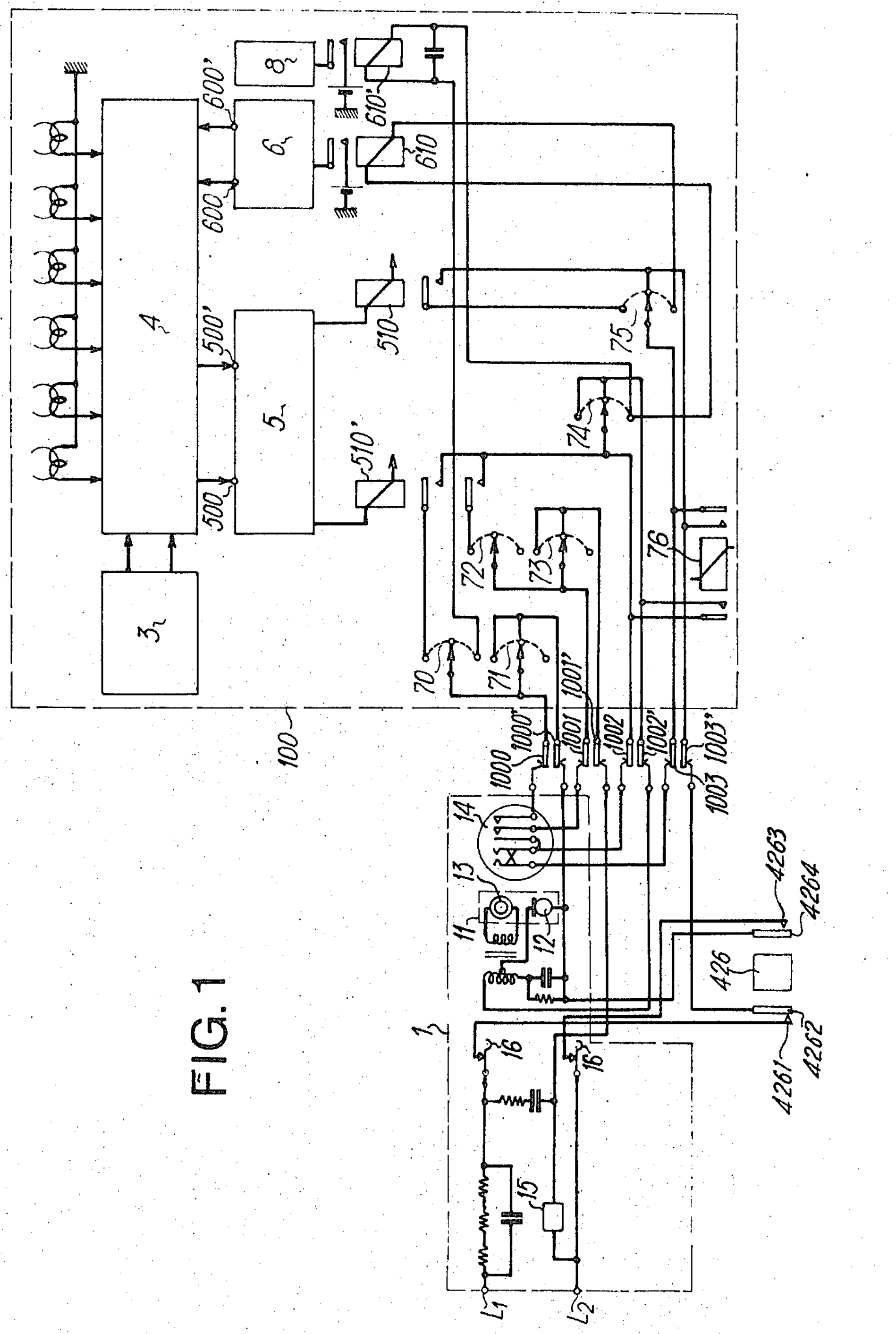
FIG. 1 is a diagrammatic view of the telephone set and the automatic call transmitter.

First of all, we shall refer to FIG. 1. On said figure, 1 relates to a conventional telephone set and 100 designates the automatic call transmitter. The telephone instrument 1 includes a telephone handset 11 with a microphone 12, and a telephone receiver 13, and a dial 14, a bell set 15 and a switch-hook 16. Automatic call transmitter 100 inputs are parallel-connected to links between the dial and the telephone set.

The automatic call transmitter 100 includes a ringing tone detector circuit 3, a programmer 4, a readout amplifier 5, and a recording oscillator 6, plus complex switching circuits indicated under 7.

Figure 2:
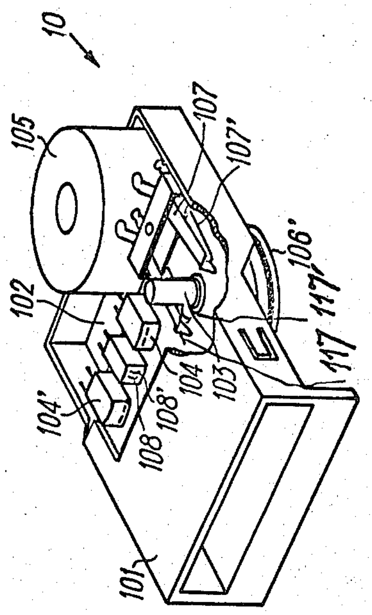
FIGS. 2 and 3 represent the cartridge tape recorder and reader.
Figure 3:
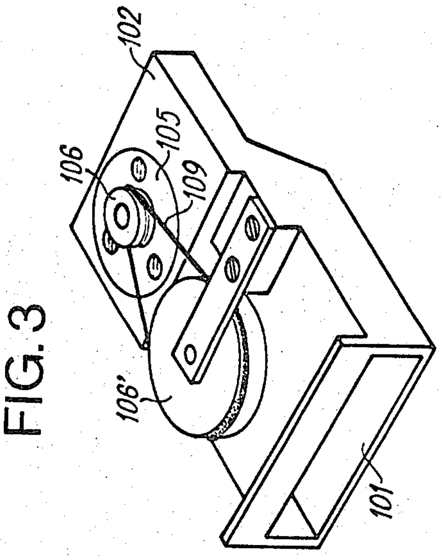

Presently, referring to FIGS. 2 and 3, we note a magnetic cartridge tape recorder 10. It comprises a casing 101 shaped as a drawer for a cartridge 20, and a baseplate 102 extending beyond the lower rack facing. This baseplate bears a capstan 103, two recording and readout heads 104 and 104', staggered in height in order to follow the two adjacent tracks of a same magnetic tape 210 respectively, and an electric motor 105 driving the capstan 103 by means of two pulleys 106 and 106', and a belt 109. Also mounted on the baseplate is a contact 107—107' and two pick-ups 108—108'. The contact 107-107' co-operates with a conductive strip borne by the cartridge which short-circuits the two contact strips 107 and 107' when the cartridge is inserted into the tape recorder. Motor 105 power circuit is only closed when the two contact strips 107 and 107' are short-circuited by the insertion of a cartridge, as shall be explained further on. The two pick-ups 108 and 108' sense the tape; the latter is provided with a metalized zone 212 which upon passing in front of the pick-ups, short-circuits them.

Figure 4:
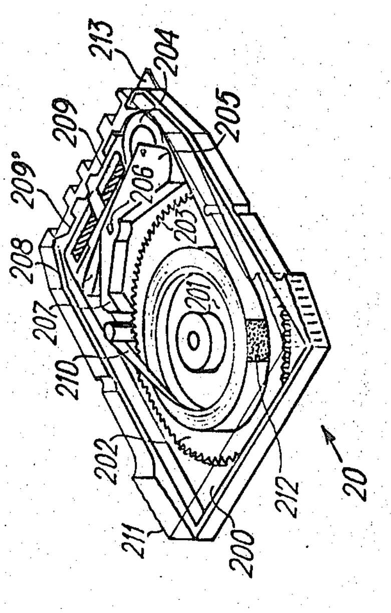
FIG. 4 represents the magnetic cartridge.

Cartridge 10 (FIG. 4) includes a base 200 on which a reel 201 can turn, and the latter has one flange 202 larger than the reel axle to bear peripheral gearing teeth 203. A rotary roller 204 is mounted at the end of a lever 205, rotatable about shaft 206 and finished at the other end by a pawl 207 able to engage with teeth 203 upon the actuation of spring strip 208. The magnetic tape 210 undertakes a certain number of turns about the axle of reel 201 and the turn adjacent to the axle escapes from it while forming a bend which overlaps the other turns. The tape then runs over two resilient seats 209 and 209', then over roller 204 from which it then shapes the external turn on reel 201. The cartridge is covered by a cover 211 represented as transparent in FIG. 4.

When cartridge 20 is set in place into the tape recorder 10, capstan 103 depresses roller 204 to free holding pawl 207 from teeth 203. The reel 201 can then turn. The capstan 103 can therefore drove the magnetic tape 210. Heads 104 and 104' push the tape against seats 209 and 209'. Head 104 records or reads over the higher track and head 104' records or reads over the lower track. Casing 101 includes eight output leads among which two for motor 105, two connected to head 104, two connected to head 104' and two connected to the two pick-ups 108 and 108'.

Cartridge 10 is fitted with a strip 213 which short-circuits contacts 107 and 107' when the cartridge is inserted into place.

Figure 5:
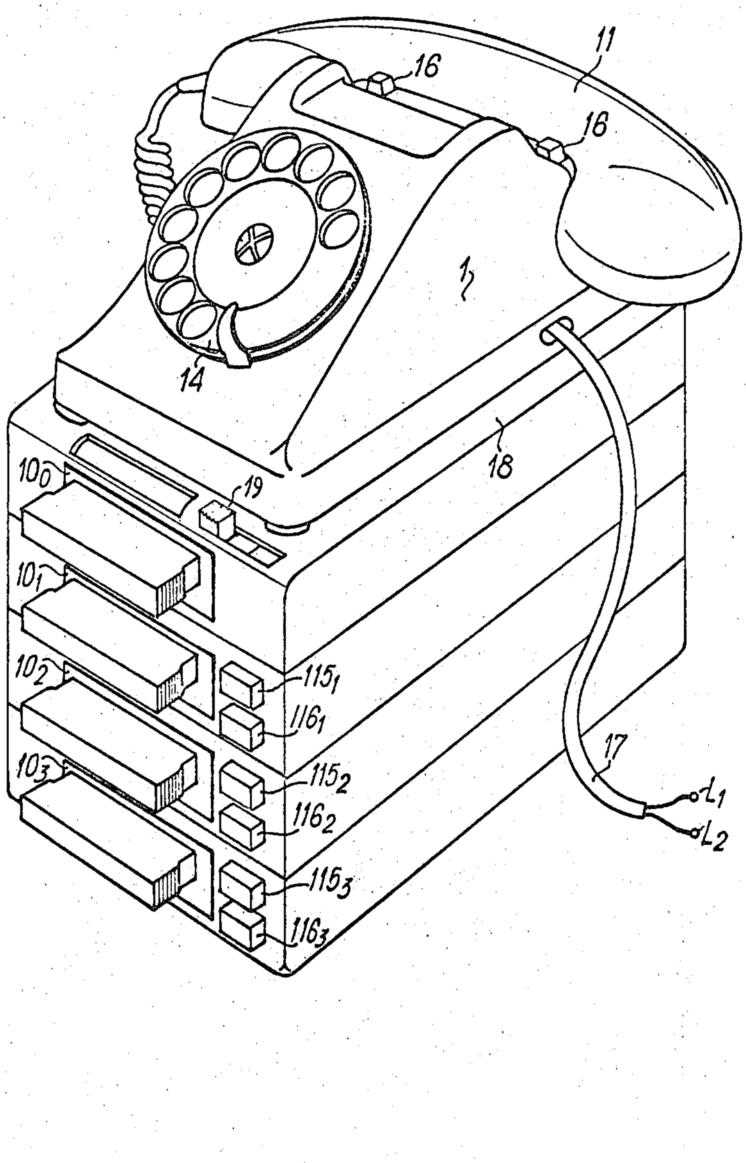
FIG. 5 represents in perspective the automatic call transmitter together with the telephone set.

Referring now to FIG. 5, it can be seen that 1 designates the telephone set already seen on FIG. 1, with its headset 11, its switch-hook 16, its dial 14 and its extension cord 17 to the telephone line $L_1$–$L_2$. The unit rests on a baseplate 18 shaped as a rack in which are fastened the drawers $\mathbf{10_1}$, $\mathbf{10_2}$, $\mathbf{10_3}$, forming the tape recorders of the type already described above in FIGS. 2 and 3. A special drawer comprises a specific tape recorder $\mathbf{10_0}$ intended to receive the temporary storage cartridge for a call number as mentioned in the introductory part. Each of the tape recorders $\mathbf{10_1}$, $\mathbf{10_2}$, $\mathbf{10_3}$ can accept insertable cartridges containing call numbers ready for eventual call. On the sides of drawers $\mathbf{10_1}$, $\mathbf{10_2}$, $\mathbf{10_3}$, two push-buttons are provided, $\mathbf{115_1}$, $\mathbf{115_2}$, $\mathbf{115_3}$, whose purpose is to select the higher or lower recording or read-out heads intended for operation and $\mathbf{116_1}$, $\mathbf{116_2}$, $\mathbf{116_3}$, to define whether the head operates in recording or readout mode.

Figure 6A:
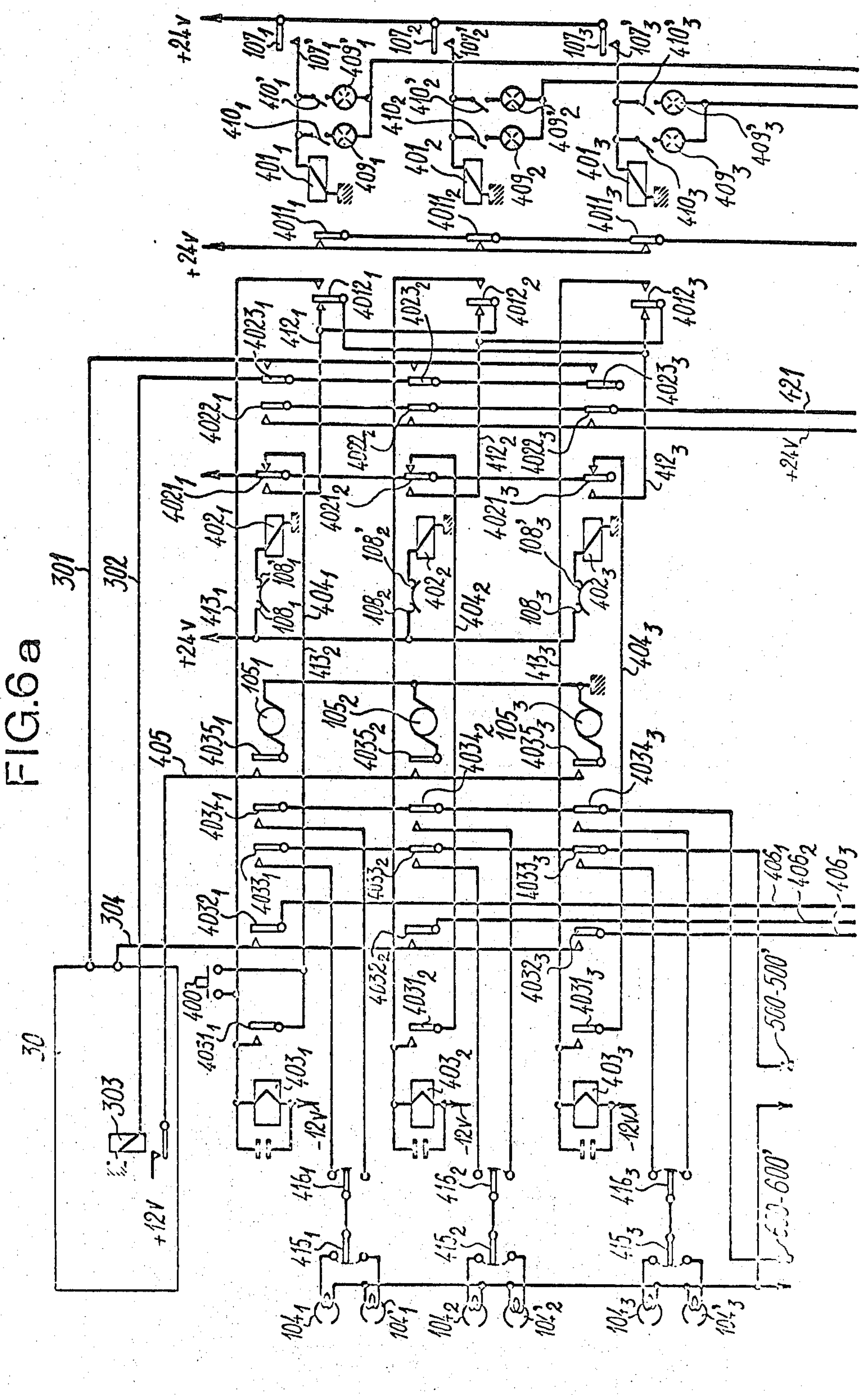
Figure 6B:
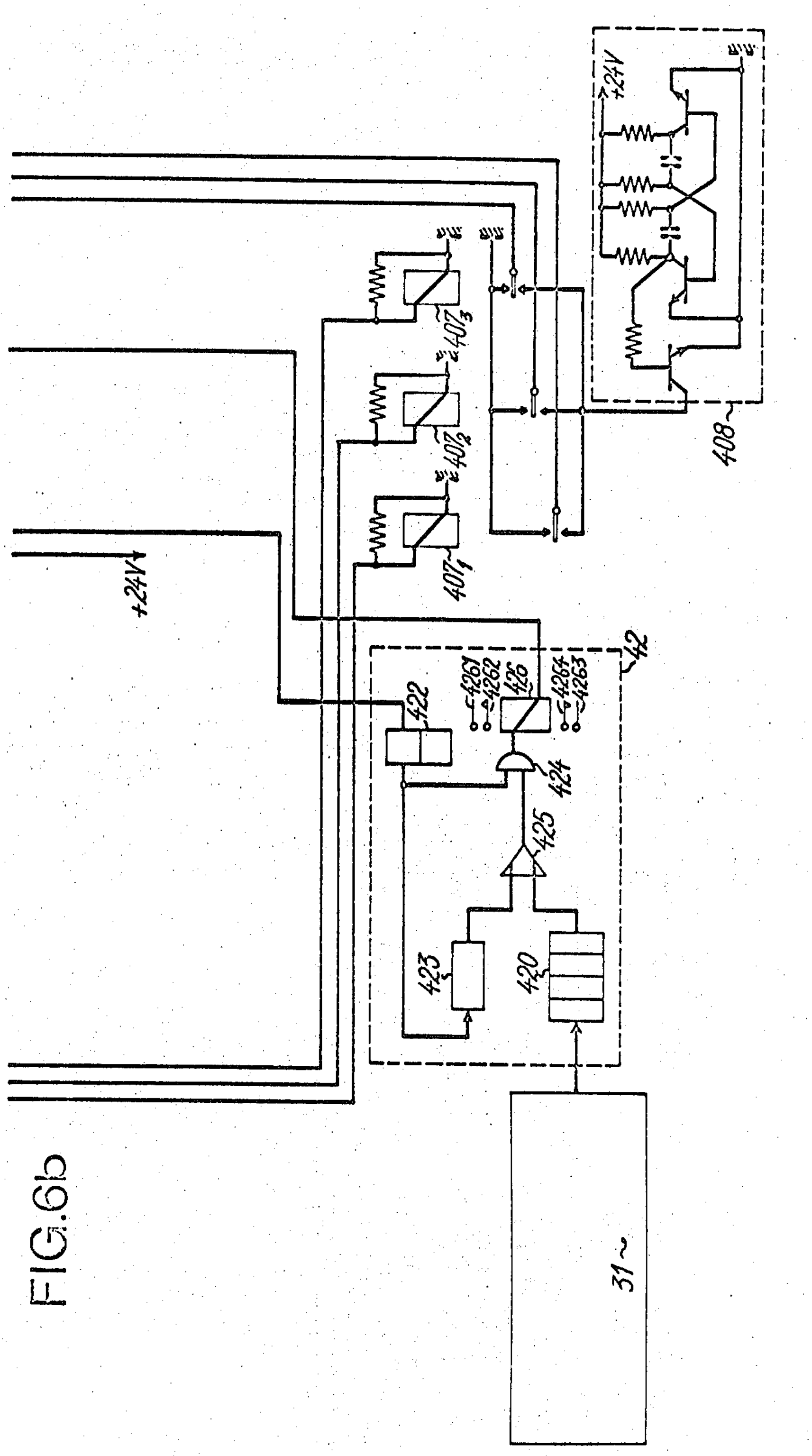

Let us now refer to FIGS. 6a and 6b. These figures show again the recording and readout heads $\mathbf{104_1}$ and $\mathbf{104_1'}$ of tape recorder $\mathbf{10_1}$, $\mathbf{104_2}$ and $\mathbf{104_2'}$ of tape recorder $\mathbf{10_2}$ and $\mathbf{104_3}$ and $\mathbf{104_3'}$ of tape recorder $\mathbf{10_3}$, contacts $\mathbf{107_1}$, $\mathbf{107_1'}$ and pickups $\mathbf{108_1}$, $\mathbf{108_1'}$ of tape recorder $\mathbf{10_1}$, contacts $\mathbf{107_2}$, $\mathbf{107_2'}$ and pickups $\mathbf{108_2}$, $\mathbf{108_2'}$ of tape recorder $\mathbf{10_2}$ and contacts $\mathbf{107_3}$, $\mathbf{107_3'}$ and pick-ups $\mathbf{108_3}$, $\mathbf{108_3'}$ of tape recorder $\mathbf{10_3}$.

It should be remembered that contacts $\mathbf{107_1}$, $\mathbf{107_1'}$ are short-circuited by strip $\mathbf{213_1}$ of the cartridge inserted into tape recorder $\mathbf{10_1}$, and that pick-ups $\mathbf{108_1}$, $\mathbf{108_1'}$ are short-circuited by the metalized zone $\mathbf{212_1}$ of the tape inside the cartridge.

Operational selection of one of the heads $\mathbf{104_1}$ or $\mathbf{104_1'}$ of tape recorder $\mathbf{10_1}$ is done by means of a switch $\mathbf{415_1}$ controlled by inverter push-button $\mathbf{115_1}$, and the selection between recording operation and readout operation is done by means of a switch $\mathbf{416_1}$ controlled by inverter push-button $\mathbf{116_1}$. The choice made of other tape recorder heads and the selection between their recording or readout operation is undertaken in a similar manner, the only difference being the switch number index and the pushbutton number index.

Whenever the magnetic tape metalized zone $\mathbf{212_1}$ of tape $\mathbf{210_1}$ of recorder $\mathbf{10_1}$ passes under pick-ups $\mathbf{108_1}$, $\mathbf{108_1'}$, relay $\mathbf{402_1}$ is attracted and the +12V potential is cut off on lead $\mathbf{404_1}$ which controls the operation of relay $\mathbf{403_1}$. This relay as shall be disclosed later on controls the ON and OFF operation of motor $\mathbf{105_1}$. However, motor $\mathbf{105_1}$ does not stop immediately and the result is that in the rest state of the motor, the tape metalized zone does not face the pick-ups and relay $\mathbf{402_1}$ is off. In said off-position, a +12V potential still exists on wire $\mathbf{404_1}$.

It is therefore assumed that all tape recorders $\mathbf{10_1}$, $\mathbf{10_2}$, $\mathbf{10_3}$ have had a cartridge inserted therein and that each cartridge tape has not its metalized zone in contact with its associated pick-ups. The result is that relays $\mathbf{401_1}$, $\mathbf{401_2}$, and $\mathbf{401_3}$ are excited, respectively, by contacts $\mathbf{107_1}$, $\mathbf{107_1'}$; $\mathbf{107_2}$, $\mathbf{107_2'}$; and $\mathbf{107_3}$, $\mathbf{107_3'}$; and that relays $\mathbf{402_1}$, $\mathbf{402_2}$ and $\mathbf{402_3}$ are inoperated.

Unit startup is done by depressing push-button 400 to energize relay $\mathbf{403_1}$ between the −12V terminal and the off-contact of relay $\mathbf{402_1}$ linked to the +12V terminal. Relay $\mathbf{403_1}$ holds through contact $\mathbf{4031_1}$.

When tone detector 30 receives the dialing tone, it applies a potential to lead 301, potential which is transmitted to lead 302 by inoperated contact $\mathbf{4023_1}$ of relay $\mathbf{402_1}$. This potential energizes relay 303 and this has for result to apply a +12V potential to leads 405. Motor $\mathbf{105_1}$ is fed through contact $\mathbf{4035_1}$. It can therefore be seen that the motor has started after reception of the dialing tone.

By means of operated contact $\mathbf{4033_1}$, the selected head is connected to input terminals 500, 500' of readout amplifier 5 whenever the unit operates in the readout mode, in other words if push-button $\mathbf{116_1}$ is on the readout position.

By means of operated contact $\mathbf{4034_1}$, the selected head is connected to output terminals 600, 600' of the recording oscillator 6 if the unit operates in the recording mode, in other words if push-button $\mathbf{116_1}$ is on the recording position.

By means of operated contact $\mathbf{4032_1}$, wire 304 coming from the dialing tone detector 30 is connected to lead $\mathbf{406_1}$ which controls relay $\mathbf{407_1}$. The latter dispatches the blinking signal produced by astable flip-flop 408 to that of the signalling lights $\mathbf{409_1}$ or $\mathbf{409_1'}$, corresponding to that of the heads $\mathbf{104_1}$ or $\mathbf{104_1'}$ which has been selected. Contacts $\mathbf{410_1}$ and $\mathbf{410_1'}$ are contacts of the inverter push-button $\mathbf{415_1}$.

When the metalized zone 212 of tape 210 threads over pick-ups $\mathbf{108_1}$, $\mathbf{108_1'}$, the relay $\mathbf{402_1}$ is excited for a short while and a pulse is transmitted over wire 421 through operated contact $\mathbf{4022_1}$. This pulse triggers a timing circuit 42 which is hereafter described.

Another pulse is also transmitted over wire $\mathbf{412_1}$ through contact $\mathbf{4021_1}$ and it is transferred to wire $\mathbf{413_2}$ through operated contact $\mathbf{4012_2}$. The result is that relay $\mathbf{403_2}$ energized and the heads are connected—depending on operating mode — to the readout amplifier 5 or the recording oscillator 6, but motor $\mathbf{105_2}$ shall not as yet turn until the dialing tone is again detected by detector 30.

It can be seen that the wiring system for contacts $\mathbf{4012_1}$, $\mathbf{4012_2}$ and $\mathbf{4012_3}$, is such that it applies to leads $\mathbf{413_2}$, $\mathbf{413_3}$, $\mathbf{413_1}$, the pulses that it receives over leads $\mathbf{412_1}$, $\mathbf{412_2}$, $\mathbf{412_3}$. Thus, a sequential system of operation for these cartridges is implemented. The detector 31 detects the audible ringing signal and transforms it into pulses which it dispatches to counter 420. This counter transmits an output signal when it has counted a preset number of pulses, four for instance. The pulse coming through wire 421 puts into state one a flipflop 422. The one output of said flipflop is connected to a timer 423 on the one hand, and to the first input of an AND gate 424, on the other hand.

The outputs of counter 420 and timer 423 are connected to the two inputs of an OR gate 425 whose output if connected to the second input of the AND gate 424. The output of the AND gate 424 is linked to a relay 426 to actuate contacts 4261, 4262, and 4263, 4264. These contacts can be seen also in FIG. 1. Their effect is to simulate a hang-up operation despite the telephone set switch-hook remaining off hook.

Therefore, we see that the threading of the metalized zone of the tape in front of the pick-ups stops the motor and triggers the timer circuit 42. The latter simulate a hang-up operation after a time duration that is equal to the shortest of two delays, either that of the timer or of reception of the four audible ringing signals. After hang-up, the dialing tone is again received by the detector 30 and at that time motor $\mathbf{105_2}$ is going to start. Therefore, in the event that the called subscriber does not answer, the next requested subscriber number is automatically dialed.

The readout amplifier 5 includes a first transistor 501 in the collector circuit of which an oscillating circuit is inserted in the shape of reactance coil 505 and capacitor 506 tuned to a 1 kHz frequency, and two amplifier transistors 502 and 503. In the collector circuit of transistor 503, a transformer 507 is inserted, and its secondary winding has a mid-point linked to ground and two ends respectively connected to two transistors 504 and 504' respectively, through two diodes 508 and 508'. The collector circuits of transistors 504 and 504' each include a relay, 510 and 510', respectively. Relay 510 is the pulse relay to simulate dial break offs and relay 510' is the pulse train relay energized during the whole train duration.

Push-button 19 on FIG. 5 is a three-way switch: "READOUT," "RECORD," "OFF-USE." In the "OFF-USE" position, switches 70 to 75 controlled by push-button 19, occupy all the intermediate positions. Under said condition, contact 1000, 1000'; 1001, 1001'; 1002, 1002'; and 1003, 1003' are short circuited and the dial terminals are directly connected to the telephone set.

In the "READOUT" position, switches 70 to 75 occupy their higher position. Under said condition, dial pulses are replaced by the beats of relay 510 through the path; terminal 1003', contact of relay 510, switch 75 in its higher position, terminal 1003, dial contacts closed, terminal 1002, switch 74 in its higher position, terminal 1002'. The short-circuits between terminals 1000, 1001, 1002 which are normally produced by the dial contacts are now produced by the contacts of relay 510'.

In the "RECORD" position, switches 70 to 75 occupy their lower position. Under said condition, dial contacts (terminals 1002 and 1003) are connected to relay 610 of oscillator 6 through the path; terminal 1003, switch 75 in its lower position, winding of relay 610, switch 74 in its lower position, terminal 1002.

The relay 610' has its winding connected in parallel to the contacts of the dial which short-circuit the combined set of the telephone and this winding is shunted by a capacitor in the same manner as relay 510' of FIG. 7. It results that relay 610' remains operated during the whole duration of the pulse train.

Oscillator 6 is a conventional oscillator operating only when it receives a positive potential through the contact of relay 610 and it is not necessary to give a complete description thereof.

The temporary store cartridge differs from the current cartridges of the call transmitter. The two heads are at the same height; one head, $\mathbf{104_0}'$, is an erasing head and the other, $\mathbf{104_0}$, is a recording and reading out head. Further, the cartridge has a second conductive strip, $\mathbf{213_0}$. In the current cartridges, this conductive strip does not exist or, if it exists, it remains unused.

The selection between the recording mode and the reading out mode is made by switch $\mathbf{416_0}$.

The connection of head $\mathbf{104_0}$ to the readout amplifier is made by the contact $\mathbf{4033_1}$ of a relay $\mathbf{403_0}$ actuated in the same manner as relays $\mathbf{403_1}, \mathbf{403_2}, \mathbf{403_3}$. The connection of head $\mathbf{104_0}$ to oscillator 6 is made by the contact $\mathbf{4034_1}$. The erasing head $\mathbf{104_0}$ is permanently connected to a source 80 of alternating erasing current.

When the temporary store cartridge is used in the recording mode, is must allow the dial breaks to be applied to the line $L_1$–$L_2$ and an alternating erasing current to be applied to head $\mathbf{104_0}'$.

The contacts $\mathbf{117_0}$–$\mathbf{117_0}'$ are short-circuited by the conductive strip $\mathbf{213_0}$. This short-circuit closes the energization path of relay 76 whose contacts connect the terminals 1002 and 1002' on the one hand and 1003 and 1003' on the other hand. Thus the dial is connected to the telephone line.

Relay 610' operates at the beginning of the actuation of the dial before open loop pulses are applied to the telephone line. This relay controls a monostable flip-flop 81 which triggers for a predetermined time the alternating current source 80. Of course, this time must be shorter than the time separating the beginning of the actuation of the dial from the first opening thereof.

A counter $\mathbf{118_0}$ displaying the directory number which has been dialed is connected to heads $\mathbf{104_0}$ and $\mathbf{104_0}'$. It comprises rectifiers for converting the alternating current pulses applied to the heads into D.C. pulses.

What I claim is:

1. A call transmitter for calling any one of the subscriber's lines in a telephone system cooperating with a telephone set having a dial and connected to a given one of said lines, said call transmitter comprising a given number of cartridge tape recorders and readers, each having a recording head, a readout head and a capstan, a plurality of magnetic tape cartridges insertable in said cartridge tape recorders and readers, each having a tape driving roller cooperating with a capstan, a detector of dialing tone connected to said given line, means controlled by said detector for driving the capstan of a selected recorder and reader, pulse generating means controlled by said dial, means for applying the pulses generated by said generating means to the recording head of the selected recorder and reader, an amplifier connecter to the readout head of the selected recorder and reader, at least one relay connected in parallel to the dial terminals and means for applying the signals read out from the magnetic tape and amplified by said amplifier to said relay.

2. A call transmitter for calling any one of the subscriber's lines in a telephone system cooperating with a telephone set having a hook and a dial, and connected to a given one of said lines, said call transmitter comprising a given number of cartridge tape recorders and readers, each having a recording head, a readout head, a capstan and a capstan motor, a plurality of magnetic tape cartridges insertable in said cartridge tape recorders and readers, each having a tape driving roller cooperating with a capstan, a detector of the dialing tone connected to said given line, means controlled by said detector for sequentially driving the capstan motors of the recorders and readers, means borne by the magnetic tapes of the cartridges for stopping said motors. a timer circuit controlled by said stopping means and means for simulating the opening of the hook and thereby causing the application of the dialing tone onto said given line, pulse generating means controlled by said dial, means for applying the pulses generated by said generating means to the recording head of the selected recorder and reader, an amplifier connected to the readout head of the selecter recorder and reader, at least one relay connected in parallel to the dial terminals and means for applying the signals read out from the magnetic tape and amplified by said amplifier to said relay.

3. A call transmitter for calling anyone of the subscriber's lines in a telephone system cooperating with a telephone set having a switch-hook and a dial, and connected to a given one of said lines, said call transmitter comprising a given number of cartridge tape recorders and readers, each having a recording head, a readout head, a capstan and a capstan motor, a plurality of magnetic tape cartridges insertable in said cartridge tape recorders and readers, each having a tape driving roller cooperating with a capstan, a detector of the dialing tone connected to said given line, means controlled by said detector for sequentially driving the capstan motors of the recorders and readers, means borne by the magnetic tapes of the cartridges for stopping said motors, a timer circuit controlled by said stopping means, switching means controlled by said timer circuit and serially connected with said switch-hook for simulating the opening of the switch-hook and thereby causing the application of the dialing tone onto said given line, pulse generating means controlled by said dial, means for applying the pulses generated by said generating means to the recording head of the selected recorder and reader, an amplifier connected to the readout head of the selected recorder and reader, at least one relay connected in parallel to the dial terminals and means for applying the signals read out from the magnetic tape and amplified by said amplifier to said relay.

4. A call transmitter as set forth in claim 3, in which the means borne by the magnetic tape of a cartridge for stopping the motor of the cartridge tape recorder and reader is formed by a metallized region on said magnetic tape and feelers borne by said recorder and reader and sensing said tape.

5. A call transmitter for calling anyone of the subscriber's lines in a telephone system cooperating with a telephone set having a dial and connected to a given one of said lines, said call transmitter comprising a given number of cartridge tape recorders and readers, each having a recording head, a readout head and a capstan, a plurality of magnetic cartridges insertable in said cartridge tape recorders and readers, each having a tape driving roller cooperating with a capstan, means for driving the capstan of a selected recorder and reader, pulse generating means controlled by said dial, means for simultaneously applying the pulses generated by said generating means to the recording head of the selected recorder and reader and the pulses generated by the dial to said given line, an amplifier connected to the readout head of the selected recorder and reader, at least one relay connected in parallel to the dial terminals and means for applying the signals read out from the magnetic tape and amplified by said amplifier to said relay.

* * * * *